United States Patent Office

3,190,844
Patented June 22, 1965

3,190,844
PROCESS FOR PRODUCING IMPROVED POLYURETHANE FOAMS USING AN AROYL AZIDE BLOWING AGENT
Charles R. Milone, Chillicothe, and Henry A. Pace, Akron, Ohio, assignors to The Goodyear Tire & Rubber Company, Akron, Ohio, a corporation of Ohio
No Drawing. Filed Aug. 3, 1962, Ser. No. 214,520
7 Claims. (Cl. 260—2.5)

This invention relates to an expanded cellular material, to a method of producing an expanded cellular material and to articles fabricated from such material. More particularly, this invention relates to an expanded cellular resin composition.

Foamed resin core materials have been previously prepared. However, these prior materials have not been satisfactory for some purposes. In certain applications, such as the fabrication of radar housings, aircraft components and guided missile parts, a critical combination of properties is required. The products of the present invention are outstanding for such highly specialized uses, as well as for other purposes because the products of the present invention have great rigidity, controlled density, fine cell structure, high impact resistance, excellent electrical properties and are capable of withstanding wide variations of heat and cold.

It is an object of this invention to produce a foamable material whose properties can be consistently reproduced.

It is another object of this invention to produce a uniform, tough, rigid foam.

It is a further object of this invention to fabriacte an internally foamed structure having strong adhesion between the foam and structure walls plus high impact resistance and good electrical transparency, i.e., the ability to transmit an electrical impulse with a minimum of diminution or deviation.

It is another object of this invention to fabricate an internally foamed structure capable of withstanding wide variations of thermal and structural stress.

Other objects and advantages will be apparent as the description proceeds.

Processes for the preparation of cellular or porous resins include the introduction of an inert gas into a resin in a confined space and suddenly releasing the pressure, the incorporation of a material which decomposes or reacts chemically under specific conditions to yield expanding gas, the use of volatile solvents which may be removed at elevated temperatures and reduced pressures, and various combinations of these processes. It has also been known to produce foamed materials employing a primary and secondary blowing agent wherein the blowable material is composed of an alkyd resin and a polymerizable monomer such as styrene. This polymerizable monomer has been a necessary component of previously prepared foamable materials blown with a primary and secondary blowing agent because it serves as a necessary means of obtaining cross-linking between the alkyd resin molecules and thus develops a blowable composition by an addition polymerization mechanism. Moreover, these previously known foamable materials have been prepared with a secondary blowing agent that generates a non-reactive gas at an elevated temperature after most of the primary blowing agent has expended itself.

The practice of the present invention involves the production of an improved foam by means of the incorporation of a primary and a supplementary foaming agent in a foaming system wherein the foamable material is composed entirely of a saturated polyester resin. The primary foaming agent reacts with the resin to produce unstable intermediates that in turn decompose to produce $CO_2$. The supplementary foaming agent must be capable of producing gas which supplements the gas generated by the primary foaming agent during the same time interval that gas is being produced by the primary foaming agent. The decomposition product produced from the supplementary blowing agent enters into further reaction with the resin to contribute to the formation of the resulting polyurethane foam structure, thus giving a rigid and more durable foam. The presence of styrene in such a system would cause the collapse of the foam or even prevent the formation of a foam, particularly in view of the fact that a peroxide-type catalyst would be required for the polymerization of the styrene. It is thus apparent that the blowable resins of the present invention are developed by a condensation polymerization mechanism in contrast to previously known blowable resins which have been blown with a primary and secondary blowing agent since these blowable resins have been formed by an addition polymerization mechanism. Furthermore, the unique combination of blowing agents employed in the present invention produces a superior foam from a saturated polyester resin which is completely cured without the necessity of employing a polymerization catalyst. One of the reasons superior foams are foamed is because the combination of primary and supplementary blowing agents employed in the present invention decompose approximately simultaneously. Based on the published decomposition temperatures of the organic diisocyanates, the primary blowing agents, and the aroyl azides, the supplementary blowing agents, it would appear that the isocyanates would be substantially completely decomposed at a somewhat lower temperature than the decomposition temperature of the aroyl azides. However, the applicants have observed that the decomposition temperatures of the aroyl azides are significantly lowered in the presence of isocyanates. Thus, organic diisocyanates and aroyl azides form a unique blowing composition that has a very advantageous gas releasing pattern.

This invention may be practiced wth various saturated polyester resins known as saturated alkyd resins, these being the condensation products of polyhydric alcohols and saturated polycarboxylic acids. Representative polyhydric alcohols which can be used in preparing alkyd resins for use in the practice of this invention are ethylene glycol, triethylene glycol, propylene glycol, dipropylene glycol, hexamethylene glycol, trimethylolpropane, and glycerol. The latter two give rigid cellular structures whereas the others give elastomeric foams. Representative carboxylic acids that contain no ethylenic unsaturation and which can be used in preparing alkyd resins by reaction with any of the above-mentioned polyhydric alcohols and other alcohols are phthalic, isophthalic, terephthalic, succinic, adipic, sebacic, 2-phenyl glutaric, citric, oxalic, malonic, glutaric, pimelic, suberic, azelaic and sebacic acids. The ratio of alcohol to acid is generally determined according to the proportion of hydroxyl and carboxyl groups desired in the alkyd resin formed therefrom. In order to have sufficient carboxyl radicals available to react with the isocyanates, it is desirable to keep the acid number of the alkyd resin within a range of 35 to 45. However, the acid number may vary from 15 to 65 and the hydroxyl number may vary from 420 to 550.

When an alkyd resin and an isocyanate are mixed in a foam-making operation there are three essential steps which must take place: (1) The first step is extension of the alkyd resin by reacting it with the isocyanate to produce an essentially linear polyurethane. (2) The second step is blowing or foaming of the essentially linear polyurethane by evolved gas. (3) The third step is cross-linking, or so-called curing of the foamed polyurethane. These phenomena are a result of inseparable chemical reactions occurring between the isocyanate and the functional groups of the alkyd. If strong uniform structure is desired, a rather delicate balance must be maintained between the rates at which these three steps proceed. Since these changes are a result of the same or closely allied chemical reactions, they cannot be manipulated individually within a given system. Any adjustments of this sort to meet different foaming requirements must be done through basic changes in the alkyd and/or the isocyanate. Sometimes, in an effort to increase the rate and extent of expansion, small amounts of additional water are added to the alkyd-isocyanate mixture. This leads to increased gas generation through the reaction of the water and the NCO groups. This technique of influencing expansion is very difficult to control due to the difficulty of uniformly incorporating the very small amounts of water and even under the best conditions foams of inferior physical properties frequently result.

This invention contemplates the use of thermally unstable materials as a supplementary source of expansion gas. More particularly, it deals with a restricted class of such materials, the aroyl azides, the decomposition products of which are favorable to the process when used in combination with isocyanate blowing agents.

Although not necessary for operability, the addition of a small amount of water aids the production of very low density foams. Usually about 1% to 3%, based on the total batch weight, is sufficient.

In the practice of this invention any organic diisocyanate may be employed. Representative examples are the aromatic diisocyanates such as the tolylene diisocyanates including 2,4-tolylene diisocyanate; 2,6-tolylene diisocyanate; p,p'-diphenyl diisocyanate; 1,5-naphthalene diisocyanate; 4,4'-diphenyl methane diisocyanate, 4,4'-diphenyl ether diisocyanate; p-phenylene diisocyanate; 3,3'-dimethyl 4,4'-diphenyl diisocyanate, 3,3'-dimethoxy 4,4'-diphenyl diisocyanate; and the aliphatic diisocyanates such as tetramethylene diisocyanate, pentamethylene diisocyanate and hexamethylene diisocyanate as well as mixtures of any of the foregoing diisocyanates. Of these the liquid diisocyanates such as the tolylene diisocyanates are preferred. The usual proportion of diisocyanate employed in preparing foams in accordance with this invention is from 85 to 115 mols percent of the theoretical amount of diisocyanate required to react with the active-hydrogen present in the polyester although a somewhat greater or lesser amount may sometimes be employed. The active-hydrogen in the polyester includes the active-hydrogen contributed by the hydroxyl and carboxyl groups of the polyester as well as the active-hydrogen contributed to the system by any water which may be present.

These isocyanates react chemically with the other ingredients, principally with the carboxyl groups of the alkyd resins and with water which may be present in the system or which may be added. Carbon dioxide is generated within the mixture by the reaction of the isocyanates with the carboxyl groups of the alkyd resins as well as with the water. These reactions are believed to proceed in accordance with the following equations which for purposes of simplicity are illustrated with monofunctional reactants, it being understood that this invention is concerned with polyfunctional alkyd resins and diisocyanates.

(1) 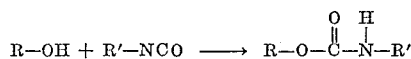

(2) 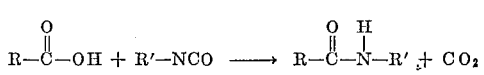

(3) 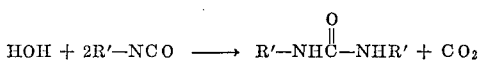

In the practice of this invention, aroyl azides are used to supplement the isocyanate blowing agents. These azides decompose under the influence of heat according to the following reaction:

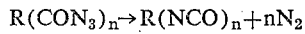

In the equation, $n$ may be 1 or 2 and the R's are aromatic radicals. The operable azides are thus compounds in which the carbonyl azide radicals are attached directly to one of the carbon atoms in the aromatic ring. Typical aromatic radicals are those selected from the group consisting of p-isopropylphenyl; p-amylphenyl; p-octylphenyl; p-t-butylphenyl; o, m and p-nitrophenyl; p-methylphenyl; m and p-chlorophenyl; p-methoxyphenyl, p-ethoxyphenyl; o, m and p-hydroxyphenyl; and naphthyl radicals.

The preferred azides for use in the practice of this invention are the aroyl azides such as para tertiary butyl benzoyl azide, para octyl benzoyl azide, 3,4-chlorophthalide azide and 2,4-dichlorobenzoyl azide.

An important feature of the use of aroyl azides in the practice of this invention is the fact that the dissociation products are isocyanates and free nitrogen. The formed isocyanates can react with carboxyl radicals and water, in accordance with the previously presented Equations 2 and 3, to form carbon dioxide which acts as a supplemental blowing agent in addition to the carbon dioxide formed from decomposition of the primary blowing agents and the nitrogen formed from the decomposition of the azides. In the case of other chemical blowing agents, the dissociation products are chemically inert to the system in which case the blowing agent becomes an inert diluent for the resin with resulting undesirable effects on electrical and/or physical properties, or the dissociation product may be reactive with isocyanates in which case the effective principal gas-forming blowing agents are reduced by this competition.

The use of the supplemental azide blowing agents of this invention does not result in either of the disadvantages. The products of dissociation are the desired inert blowing gas, nitrogen, and an isocyanate which can supplement or partially substitute for the principal isocyanate blowing agent. The isocyanates originating from the azides react to become an integral part of the resin molecule by any and all of the reaction mechanisms available to the primary blowing agents, the isocyanates. Thus, the practice of the invention provides a technique for increasing the rate and extent of expansion without basic changes in the alkyd isocyanate system. The following examples illustrate the practice of this invention, but it is not limited thereto.

*Example 1*

A foaming material was prepared from the following ingredients:

100 grams of glycerol phthalate adipate alkyd resin prepared by reacting 4 moles glycerol, 2.5 moles adipic acid, 0.5 mole phthalic anhydride to produce a resin having an acid number of 45, a hydroxyl number of 494 and containing approximately 1% water 95 grams tolylene diisocyanate 5 grams para tertiary butyl benzoyl azide This mixture was stirred until thoroughly homogenous and poured into an open pan. Thereafter it was cured for one and one-half hours at 158° F. followed by one hour at 193° F. An excellent, fine-celled, foamed structure resulted having a density of 6 pounds per cubic foot whereas a similar foam prepared without the supplemental blowing agent had a density of 9 pounds per cubic foot. Also, the foam prepared according to this example displayed excellent strength and toughness as illustrated by the fact that it was crushed into a thin sheet, rupturing the foam without friability of the cell walls.

*Example 2*

A foaming material was prepared from the following ingredients:

100 grams of glycerol phthalate adipate alkyd resin prepared by reacting 4 moles glycerol, 2.5 moles adipic acid, 0.5 mole phthalic anhydride to produce a resin having an acid number of 45, a hydroxyl number of 494 and containing approximately 1% water
95 grams tolylene diisocyanate
3 grams para tertiary butyl benzoyl azide This mixture was stirred as in Example 1 and placed between resin-impregnated glass fiber laminated skins about .030 inch thick to provide a panel. The cell structure of the foamed core of this panel displayed excellent uniformity, toughness and electrical transmissibility in addition to being substantially lower in density than a similar panel constructed without the use of the supplemental blowing agent.

*Example 3*

A foaming material was prepared from the following ingredients:

150 grams of glycerol phthalate adipate alkyd resin prepared in accordance with Examples 1 and 2
136 grams tolylene diisocyanate
15 grams para tertiary butyl benzoyl azide
16 cc. of 10% Acetone-Aerosol OT solution (90% acetone, 10% sodium sulfosuccinate)

These ingredients were mixed as in Example 1 and poured into a 4" x 6¾" x 10¼" aluminum foil-lined pan and thereafter placed in an oven at room temperature. The heat and blower were turned on with the thermostat set at 200° F. At 140° F. the foam height was 7" and thus well above the edge of the pan. The final cure was accomplished at 275° F. during a period of two hours. There was no cracking of the cell structure, no collapse of the foam, and no surface bubbling during the blowing of the resin. The cell structure was tough and flawless throughout the entire volume. The density of the foam was 2.3 pounds per cubic foot. A ³⁄₁₆" sheet of the foam was rolled with a rolling pin with no crumbling of cell walls. The crushed sheet of foam was then creased through arcs of plus and minus 180° without any breaking.

Other foams and interfoamed structures have been prepared as in Examples 1 through 3 except that p-octyl benzozyl azide, 3-chlorophthalide azide and 2,4-dichloro benzoyl azide were used in place of the t-butyl benzoyl azide. Comparable results were achieved in that the cell structures were tough, uniform and electrically transparent and the densities were uniformly lower than the products prepared without the azides.

The temperature resistance of a typical foam prepared in accordance with the present invention, and specifically in accordance with the teachings of Example 3 above, was compared with a foam prepared in accordance with the teachings of the prior art, and specifically in accordance with the teachings of Example 1 of United States Patent 2,740,743.

The procedure employed in determining the temperature resistance of the foam samples was based on ASTM test D–648 modified in accordance with the following description in an effort to compensate for differences in foam densities.

The specimen was supported on steel supports 4 inches apart. The load was applied on top of the specimen vertically and midway between the supports. The contact edges of the supports and pressure applicator were rounded to a radius of ⅛". The specimen and support were placed in an electric, fan circulated oven with a mercury thermometer within 6" of the specimen, both specimen and thermometer being within the turbulent air flow created by the fan. A very light steel tube welded to the pressure applicator extended vertically through an opening in the roof of the oven. A spring wire contact was attached to the top end of this tube. Also attached to the pressure bar was a rigid hook bent so as to be in line with the veretical tube and below the specimen, on which the test loads were hung. The combined weight of the pressure bar, tube, and hook was 23 grams. Attached to the base plate of the supports was a vertical angle iron strut extending through the top of the oven parallel to the tube of the pressure bar. This strut carried, near its top, a loose fitting, electrically insulated guide for the tube; and, above that, a micrometer screw which could engage the contact spring on the tube. Contact between the spring and micrometer screw was detected by means of a ¼ watt neon lamp. This arrangement resulted in a substantially friction-free load-applying and deflection-measuring system.

The tests were made by placing a suitable weight on the hook, slowly raising the temperature of the oven, and following the deflection of the specimen with the micrometer. The rate of heating resulted from a constant input of electrical energy to the oven heating element. The rate varied from 2½° C. per minute at the start, to about 1° C. per minute at the end of each test. The heat distortion point was defined as the temperature at which a 0.1" deflection occurred under an adjusted flexing load.

Since the test was dependent upon varying the load upon each of the foams tested in accordance with their density a formula was devised to determine this load as follows:

$$\frac{K}{D}=L$$

Before this formula could be used in actual practice it was necessary to determine K.

A weight, L', of 431 grams was chosen to determine how much foam samples in the 7–12 pounds per cubic foot density range would be deflected. These samples had dimensions of ½" x ½" x 5". It was found that the average deflection, D', under the 431 gram load at room temperature was .052".

Thus in the formula $$\frac{K'}{D'}=L'$$

L'=431 grams, D'=.052" and $$K=L' \times D'=431 \times .052=22.4$$

Since a weight of 431 grams would be much too heavy to produce reasonable deflections in foam samples when they are heated to temperatures substantially above room temperature it is apparent that a somewhat lighter load should be employed when testing samples at elevated temperatures. Observations of trial test samples at elevated temperatures indicated that a load approximately one-tenth of 431 grams produced reasonable and measurable deflections in most foams. The numerical value of the determined empirical constant K was therefore divided by ten to give a value of 2.24. This constant was incorporated into the working formula $$\frac{K}{D} = L$$

or $$\frac{2.24}{D} = L$$

wherein D was the deflection in inches produced by a 431 gram weight hung on the foam under test, at room temperature. L was the total load which was applied to the specimen under test during the heating period. However, since the pressure bar assembly weighs 23 grams, the final adjusted flexing load added to the pressure bar assembly was $L-23$ grams.

For example, if the deflection of a specimen at room temperature under the 431 gram load was .025 inch then $$\frac{K}{D} = L$$

or $$\frac{2.24}{.025} = 90 \text{ grams}$$

Since the pressure bar weighs 23 grams then the final adjusted flexing load for the test would be $90-23=67$ grams.

For very low density foams a weight of 431 grams would produce too great a deflection in the sample even at room temperature. Therefore a new empirical constant was determined for very low density foams in the range of 2 to 5 pounds per cubic foot using a deflection load on the hook of the pressure bar assembly which would produce a similar average deflection of 0.052 inch at room temperature, as the 431 gram load produced in the higher density range. For very low density foams it was found that a weight of 200 grams would produce this average deflection of .052 inch. Substituting these values in the above formula a new value for K was calculated to be 10.4. Dividing the value of this constant by 10 in order to calculate loads which would give reasonable deflections to very low density foams at elevated temperatures gives a new value of the empirical constant equal to 1.04. Substituting these calculated values in the above formula the adjusted flexing load ($L''$) to be hung on the pressure bar assembly in order to determine the heat distortion point of very low density foams is $$\frac{K''}{D''} = L$$

$K''=1.04$ or finally $$\frac{1.04}{D''} = L''$$

and since the bar weighs 23 grams the final adjusted weight which had to be added for the test was $L''-23$ grams.

The following results were obtained by carrying out the above-described test on the previously identified samples:

| Foam Description | Temperature at which .1 inch deflection occurred under an adjusted load, ° C. |
|---|---|
| Sample 1—Foam prepared in accordance with teachings of Example 3 of present application | 120 |
| Sample 2—Foam prepared in accordance with teachings of Example 1 of U.S. Patent 2,740,743 | 49 |

The foregoing results clearly indicate that the temperature resistance of foams prepared in accordance with the present invention are surprisingly superior to the previously known foam evaluated. The potential commercial importance of the much improved heat resistance of the present foams will be apparent when foam applications such as high fidelity radar housings, commercially known as radomes, and the encapsulation of electrical assemblies are considered where even slight thermal distortions may adversely affect the transmission and reception of electrical impulses.

The aroyl azides decompose at about 25 to 150° C. to liberate gaseous nitrogen products. The primary blowing agents, the isocyanates, react at temperatures as low as 25° C. to 50° C. and up to 150° C. However, since the supplementary blow is actually initiated essentially simultaneously with the exothermic reaction of the primary blow, there is substantial overlapping of the primary and supplementary gas evolution steps. The overlapping of the gas evolution stages is very desirable because it starts and advances the pore formation within wall structures created by the primary blow before gelation occurs. This is necessary because gas evolution after gelation would tend to rupture the foam structure. By following the teachings of the present invention the resulting product is a more highly cellular foam which is sturdier because the cells are small and uniformly spaced. This fine pore formation cannot be brought about by the use of either the primary or supplementary blowing agent alone but can only be obtained by the combined effect of both.

Any of the customary emulsifying agents may be added, if desired, in order to secure better dispersion of blowing ingredients and a better dispersion of any added water which helps provide a more uniform foam. Also, an emulsifying agent helps obtain complete, homogenous foaming action.

Although not necessary in practicing the invention, the emulsifier, the filler and the supplementary blowing agent, e.g., an aroyl azide, may be stirred together until homogeneity is achieved. Any non-reactive emulsifier may be used. A 10% water solution of sodium lauryl sulfonate or sodium alkyl naphthalene sulfonate is preferred as the emulsifier. These solutions serve as foaming aids by bringing about more complete dispersion of the water within the foaming mixture thereby creating a more uniform foaming condition. About 10 milliliters of the 10 percent emulsifier-water solution in 300 grams of foamable resin may be employed, if desired.

Although not necessary in the practice of the present invention any non-reactive pulverulent material may serve as a filler, e.g., flocculated cellulose, lamp black, carbon black, mica and silica acid. Two hundred mesh walnut shell flour is preferred. About 5% to 15% of filler, based on the weight of the foaming resin, can be used but best results are obtained by using 8 to 10 percent by weight.

The inclusion in the foaming system of an aroyl azide as a booster or supplementary foaming agent in addition to the primary foaming agent, an isocyanate, makes possible more reproducible properties and control of density. The practice of this invention also makes possible the production of a fine-celled electrically transparent core material. Based on the weight of the foaming resin, about 1% to 25% by weight of an aroyl azide can be used, although about 3% to 15% is preferred.

In practicing the invention, the previously prepared mixture of emulsifier, filler, aroyl azide and alkyd resin may be mixed with the primary foaming material, the diisocyanate, and stirred until homogenous. When the mixing is completed, the foaming system is ready for use. The primary foaming agent may be selected from a group of isocyanates such as the diisocyanates comprising 2,4-tolylene diisocyanate, methylene diphenyl diisocyanate, p-p'-diphenyl diisocyanate, hexamethylene, diisocyanate and 1,5-naphthalene diisocyanate.

The formulation thus prepared can be balanced to provide a foam which varies in density from 2 to 15 pounds per cubic foot. These foams may be used as fillers for laminates, as insulation barriers, etc.

Various materials can be used to form the walls of a foamed-in-place laminated structure. Some of these materials are laminated glass fiber sheets, plywood, wood veneer, aluminum, steel, etc. In the practice of this invention, laminated glass fiber sheets are preferred.

If desired, organic tertiary amines such as N-methyl morpholine, N-ethyl morpholine as well as the condensation products of butyraldehyde and aniline or butyraldehyde and butylamine may be used as accelerators or catalysts to enhance the polymerization of the resins. Although these may be used, most satisfactory foams have been made without polymerization catalysts.

This application is a continuation-in-part of application Serial No. 21,878, filed April 13, 1960, and now abandoned, which in turn is a continuation-in-part of application Serial No. 727,549, filed April 10, 1958 and now abandoned.

While certain representative embodiments and details have been shown for the purpose of illustrating the invention, it will be apparent to those skilled in the art that various changes and modifications may be made therein without departing from the spirit or scope of the invention.

We claim:

1. The process of producing an electrically transparent resin foam which comprises admixing (1) a blowable material composed of a saturated alkyd resin having an acid number ranging from 15 to 65 derived from the condensation of polyhydric alcohols and saturated polycarboxylic acids, (2) from 85–115 mole percent of the theoretical amount of organic diisocyanate required to react with the active hydrogen present in the alkyd resin, and (3) from 1 to 25 percent by weight, based on the weight of alkyd resin, of an aroyl azide which decomposes at temperatures ranging from 25° C. to 150° C. and heating until foaming is completed.

2. The process of producing an electrically transparent resin foam which comprises admixing (1) a blowable material composed of a saturated alkyd resin having an acid number ranging from 35 to 45 derived from the condensation of polyhydric alcohols and saturated polycarboxylic acids, (2) from 85–115 mole percent of the theoretical amount of organic diisocyanate required to react with the active hydrogen present in the alkyd resin, and (3) from 1 to 25 percent by weight, based on the weight of alkyd resin, of an aroyl azide which decomposes at temperatures ranging from 25° C. to 150° C. and heating until foaming is completed.

3. The process of producing an electrically transparent resin foam which comprises admixing (1) water, (2) a wetting agent, (3) a blowable material composed of a saturated alkyd resin having an acid number ranging from 15 to 65 derived from the condensation of polyhydric alcohols and saturated polycarboxylic acids, (4) from 85–115 mole percent of the theoretical amount of organic diisocyanate required to react with the active hydrogen present in the alkyd resin and water, and (5) from 1 to 25% by weight, based on the weight of the alkyd resin, of an aroyl azide which decomposes at temperatures ranging from 25° C. to 150° C. and heating until foaming is completed.

4. The process of producing an electrically transparent resin foam which comprises admixing (1) water, (2) a wetting agent, (3) a blowable material composed of a saturated alkyd resin having an acid number ranging from 15 to 65 derived from the condensation of polyhydric alcohols and saturated polycarboxylic acids, (4) from 85–115 mole percent of the theoretical amount of organic diisocyanate required to react with the active hydrogen present in the alkyd resin and water, and (5) from 1 to 25% by weight, based on the weight of alkyd resin, of an aroyl azide selected from the group consisting of para butyl benzoyl azide, para octyl benzoyl azide and 2,4-dichlorobenzoyl azide and heating until foaming is completed.

5. The process of producing an electrically transparent resin foam which comprises admixing (1) water, (2) a wetting agent, (3) a blowable material composed of a saturated alkyd resin having an acid number ranging from 35 to 45 derived from the condensation of polyhydric alcohols and saturated polycarboxylic acids, (4) from 85–115 mole percent of the theoretical amount of 2,4-toluene diisocyanate required to react with the active hydrogen present in the alkyd resin and water, and (5) from 1 to 25% by weight, based on the weight of alkyd resin, of para-tertiary butyl benzoyl azide and heating until foaming is completed.

6. The process of producing an electrically transparent resin foam which comprises admixing (1) a blowable material composed of a saturated alkyd resin having an acid number ranging from 35 to 45 derived from the condensation of polyhydric alcohols and saturated polycarboxylic acids, (2) from 1 to 10% by weight of a finely divided filler, (3) from 1 to 5% by weight, based on the weight of the resin, of a dispersing agent, (4) from 1 to 25% by weight, based on the weight of the resin, of an aroyl azide which decomposes at temperatures ranging from 25° C. to 150° C., and (5) from 85–115 mole percent of the theoretical amount of an organic diisocyanate required to react with the active hydrogen present in the alkyd resin and heating until foaming is completed.

7. In the process of preparing an electrically transparent alkyd resin foam prepared from a saturated alkyd resin having an acid number ranging from 15 to 65 derived from the condensation of polyhydric alcohols and saturated polycarboxylic acids, and which is reacted and blown with an organic diisocyanate, the step which comprises the addition of a supplemental blowing agent consisting of from 1 to 25% by weight, based on the weight of alkyd resin, of an aroyl azide which decomposes within substantially the same temperature range as is produced in the exothermic reaction between said organic diisocyanate and said alkyd resin.

References Cited by the Examiner

UNITED STATES PATENTS

| 2,529,512 | 11/50 | Ott | 260—2.5 |
| 2,577,280 | 12/51 | Simon et al. | 260—2.5 |
| 2,740,743 | 4/56 | Pace | 260—2.5 |

FOREIGN PATENTS

| 719,102 | 11/54 | Great Britain. |

LEON J. BERCOVITZ, *Primary Examiner.*

WILLIAM H. SHORT, DONALD E. CZAJA, *Examiners.*